(12) United States Patent  
Berg

(10) Patent No.: US 8,260,141 B2
(45) Date of Patent: Sep. 4, 2012

(54) METHOD TO TRANSFORM A DYNAMIC ANALOG OPTICAL NETWORK TO A DIGITAL REPRESENTATION

(75) Inventor: Loren Berg, Richmond (CA)

(73) Assignee: Ciena Corporation, Hanover, MD (US)

( * ) Notice: Subject to any disclaimer, the term of this patent is extended or adjusted under 35 U.S.C. 154(b) by 265 days.

(21) Appl. No.: 12/722,841

(22) Filed: Mar. 12, 2010

(65) Prior Publication Data

US 2011/0222851 A1    Sep. 15, 2011

(51) Int. Cl.
*H04J 14/00* (2006.01)
*H04J 14/02* (2006.01)

(52) U.S. Cl. ............................ 398/91; 398/94; 398/48

(58) Field of Classification Search .............. 398/5, 38, 398/82–85, 91, 94, 95, 48
See application file for complete search history.

(56) References Cited

U.S. PATENT DOCUMENTS

| | | | |
|---|---|---|---|
| 7,706,688 B2 * | 4/2010 | Boudreault et al. ............ 398/59 |
| 2007/0014571 A1 | 1/2007 | Roberts et al. | |
| 2007/0189775 A1 * | 8/2007 | Charlet et al. ................ 398/147 |
| 2011/0211841 A1 * | 9/2011 | Leclair et al. ................. 398/140 |

* cited by examiner

*Primary Examiner* — Dalzid Singh
(74) *Attorney, Agent, or Firm* — Kent Daniels; Blake, Cassels & Graydon LLP

(57) ABSTRACT

A system for enabling reconfiguration of a Wavelength Division Multiplexed (WDM) optical communications network. A plurality of channel transmitters are provided for generating respective optical signals within corresponding wavelength channels of the network. A broadband light source generates a broadband continuous wave light having a bandwidth corresponding to a channel band of the network. A wavelength selective switch includes a first switch port connected to receive optical signals from the channel transmitters. A second switch port is connected to receive the broadband continuous wave light from the broadband light source. The wavelength selective switch is configured to comb the broadband continuous wave light into a plurality of narrowband lights respectively corresponding with wavelength channels of the network. A common-OUT port of the wavelength selective switch outputs a WDM signal for transmission through a downstream fiber span of the network. The wavelength selective switch is controlled to switch optical signals from the first switch port to the common-OUT port as active wavelength channels, and further to switch narrowband lights corresponding to inactive channel wavelengths to the common-OUT port. Consequently, a spectral loading of the WDM signal is independent of the number of active wavelength channels.

8 Claims, 4 Drawing Sheets

METHOD TO TRANSFORM A DYNAMIC ANALOG OPTICAL NETWORK TO A DIGITAL REPRESENTATION

CROSS-REFERENCE TO RELATED APPLICATIONS

This application is the first application filed for the present invention.

MICROFICHE APPENDIX

Not Applicable.

TECHNICAL FIELD

The present invention relates generally to optical communication systems, and in particular to methods for transforming a dynamic analog optical network to a digital representation.

BACKGROUND

FIG. 1a schematically illustrates a representative optical fibre link 2 in a conventional WDM optical communications system. In the illustrated example, the fibre link 2 comprises three optical fiber spans 4 extending between a transmitter node 6 and a receiver node 8, and traverses an optical amplifier 10 and a Reconfigurable Optical Add-Drop Multiplexer (ROADM) 12. As is well known in the art, optical fibre links commonly have multiple spans, and include a variety of optical devices, such as optical amplifiers and ROADMs, for example. Transmitters and receivers are commonly incorporated into network nodes which provide some combination of signal regeneration, electrical switching (such as wavelength switching), and layer-2 (or higher) signal routing functionality. Typically, a bidirectional optical link comprises a pair of parallel fibre links 2 extending between the two end nodes. Normally, these parallel fibre links will be constructed as a "mirror image" of each other, so as to convey optical signals in respective opposite directions. For this reason, only one fibre link is shown in FIG. 1a.

The transmitter node 6 generally comprises a set of n parallel channel transmitters 14, each of which transmits a respective optical data signal within an optical channel having a predetermined center wavelength. Typically, the number and wavelength spacing of optical channels follows a predetermined spectral grid, such as for example, those published by the International Telecommunications Union (ITU). An optical MUX 16 combines each of the wavelength channels into a WDM signal that is launched through the optical fibre link 2.

The receiver node 8 generally comprises and optical DEMUX 18, which receives a WDM signal through the optical fibre link 2, and routes each of the wavelength channels to respective different channel receivers 20 for detection and data recovery using techniques known in the art.

As is known in the art, a Reconfigurable Optical Add-Drop Multiplexer (ROADM) 12 can be constructed as shown in FIG. 1b. The ROADM 12 generally comprises a 1×m Wavelength-Selective Switch (WSS) 22 which includes a common-IN port 24, a common-OUT port 26 and set of m switch ports 28. Each switch port 28 comprises an input 30 and an output 32. In operation, the WSS 22 is designed to selectively switch any wavelength channel from the common-IN port 24 to the output 32 of any one of the switch ports 28, and to selectively switch any wavelength channel received through the input 30 of any given switch port 28 to either the common-OUT port 26 or to the output 32 of any one of the other switch ports 28. In the ROADM 12 of FIG. 1b, switch port No. 1 is used to support local Add/Drop traffic. Thus, a set of wavelength channels to be dropped is identified, and the WSS 22 controlled to switch these channels of WDM signal received through the common-IN port 24 to the output 32 of switch port No. 1, while routing the other channels to the common-OUT port 26. The dropped channels are then routed to a local demux 34, which supplies each dropped channel to a respective channel receiver 36 for detection and data recovery using methods known in the art. Conversely, channels to be added are generated by respective channel transmitters 38, combined into a WDM signal by optical MUX 40, and supplied to the input 30 of switch port No. 1. The WSS 22 is then controlled to switch these channels from the input 30 of switch port No. 1 to the common-OUT port 26.

For simplicity of illustration, no optical connections are shown in respect of the other switch ports 28 (that is, switch ports 2 . . . m). Typically, at least some of these switch ports 28 would be used to enable optical channel switching to another WSS (i.e. of the same or a different ROADM. Among other things, this functionality can be used to support branching in an optical mesh network.

The maximum number N of wavelength channels in the network is determined by the spectral grid upon which the network was designed. However, the number of active wavelength channels at any given time may be less than this maximum number N of wavelength channels. For the purposes of the present discussion, an active channel is a channel in which an optical signal is present and is being controlled by the steady-state network control systems of the network. Conversely, an inactive channel is a channel for which the corresponding channel transmitter 14,32 is not generating an optical signal, either because it is un-powered or in fact it has not been installed. In a dynamic optical network, the number of active channels typically varies with the data traffic load. Thus, in the example of FIG. 1a, the number of active wavelength channels between the transmitter node 4 and the OADM 12 may be different from the number of active channels between the OADM 12 and the receiver node 8, and the number of active channels in each of these sub-spans may change with time.

The specific number and distribution of active wavelength channels within a given span of the network may be referred to as the "spectral loading" of that portion of the network. Adding or subtracting wavelength channels (by changing an inactive channel to an active state or visa versa, for example) changes this spectral loading.

As is known in the art, dynamic optical networks are controlled, optimized, and reconfigured using a multi-layer hierarchal analog network control system. Such a control system is required because an optical network behaves differently depending on the spectral loading. When the spectral loading of the network changes, other active channels in the network can be perturbed resulting in loss of data. In order to avoid this problem, a multi-step sequential and iterative process is followed in order to transition the network from the previous spectral loading state to the new state. Applicant's co-pending U.S. patent application Ser. No. 11/533,166, filed Sep. 19, 2006 and entitled "Control Of Parameters In A Global Optical Controller", teaches methods of this type. Thus, for example, in order to add a channel, the method of U.S. patent application Ser. No. 11/533,166 first examines the performance of the existing system to determine if operating conditions in the communications system (e.g. the traffic load and noise margin) are conducive to addition of a new optical channel. If operating conditions are conducive to addition of the new channel, a desired power level of the new channel and then the power level of the incoming channel gradually increased to that desired power level. If operating conditions continue to be conducive to addition of the new channel, a weighting coefficient associated with the new optical channel in a cost function of the optical communication system is gradually increased, so that the steady-state control and optimization functions of the network will fine tune the operation of the new channel. If, at any point during the above process, the performance of any existing channels drops below a predetermined threshold, then the addition of the new channel is aborted. In addition to the complexity involved in implementing methods such as this, there is also the shortcoming that reconfiguration of a large optical network can take a substantial amount of time (On the order of 10 s of minutes).

Techniques enabling reconfiguration of an optical network that overcome limitations of the prior art remain highly desirable.

SUMMARY

Accordingly, an aspect of the present invention provides A system for enabling reconfiguration of a Wavelength Division Multiplexed (WDM) optical communications network. A plurality of channel transmitters are provided for generating respective optical signals within corresponding wavelength channels of the network. A broadband light source generates a broadband continuous wave light having a bandwidth corresponding to a channel band of the network. A wavelength selective switch includes a first switch port connected to receive optical signals from the channel transmitters. A second switch port is connected to receive the broadband continuous wave light from the broadband light source. The wavelength selective switch is configured to comb the broadband continuous wave light into a plurality of narrowband lights respectively corresponding with wavelength channels of the network. A common-OUT port of the wavelength selective switch outputs a WDM signal for transmission through a downstream fibre span of the network. The wavelength selective switch is controlled to switch optical signals from the first switch port to the common-OUT port as active wavelength channels, and further to switch narrowband lights corresponding to inactive channel wavelengths to the common-OUT port. Consequently, a spectral loading of the WDM signal is independent of the number of active wavelength channels.

BRIEF DESCRIPTION OF THE DRAWINGS

Representative embodiments of the invention will now be described by way of example only with reference to the accompanying drawings, in which.

It will be noted that throughout the appended drawings, like features are identified by like reference numerals.

DETAILED DESCRIPTION OF PREFERRED EMBODIMENTS

In very general terms, the present invention leverages the observation that a wavelength selective switch comprises an optical demux that operates to separate a WDM optical signal received through the input 30 of a given switch port 28 into its respective channels, each of which can then be selectively switched to the common-OUT port 26, for example. In the present invention, this observation is exploited to convert the dynamic analog optical network to a digital representation in which addition or subtraction of active channels can be handled easily using simple switching techniques.

Figure 2A:
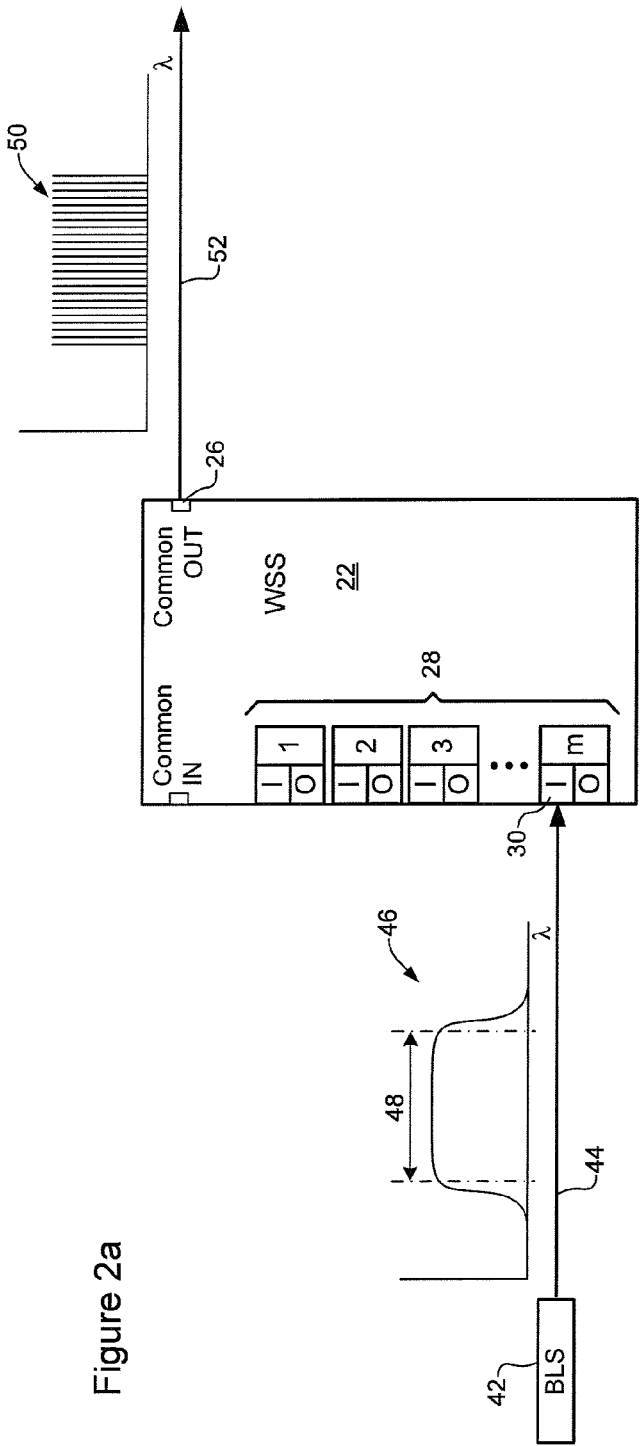
FIGS. 2a and 2b illustrate elements and operations of a broadband light source usable in representative embodiments of the present invention.

Referring to FIG. 2a, in accordance with the present invention, a broadband light source (BLS) 42 is configured to generate a broadband continuous wave (CW) light 44 having a spectrum 46 which is flat across a bandwidth 48 corresponding with at least one channel band of the network. The broadband light 44 is then supplied to the input 30 of one of the switch ports 28, and the WSS mux effectively combs this CW light into a set of narrowband lights corresponding to wavelength channels of optical network. These narrowband lights can then be selectively switched through the WSS 28 to the common-OUT port 26 on a per-channel basis. When all of the narrowband lights are treated in this manner, the spectrum 50 of the light 52 emerging from the common-OUT port 26 emulates a WDM signal with a spectral loading of 100%. Preferably, the optical power of the (CW) light 44 is controlled such that combing in the WSS 22 will produce narrowband lights having power levels that are consistent with the power level of active channels in the network. Matching the power level of each narrowband light to the power level of active channels is beneficial in that it improves the degree to which the light 52 emerging from the common-OUT port 26 emulates a WDM signal.

Figure 2B:
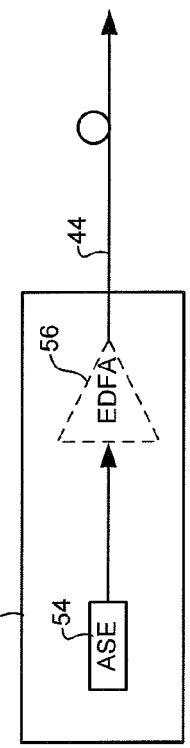

Referring to FIG. 2b, the BLS 42 comprises an optical emitter 54 which is driven to generate the broadband light 44. The emitter 54 may be an Erbium Doped Fibre Amplifier (EDFA) generating Amplified Spontaneous Emission (ASE), or a superluminescent light emitting diode (LED) having a suitable spectral response, but this is not essential. In some embodiments, two or more emitters 54 having respective different spectral ranges may be used, to obtain a CW light 44 having the desired bandwidth 48. If desired, known optical equalization techniques may be used to obtain a substantially flat spectrum across the bandwidth 48 of interest. An optical amplifier 56 (such as, for example, an Erbium Doped Fibre Amplifier—EDFA) may be used to increase the optical power of the broadband light 44, if necessary.

In some embodiments, the bandwidth 48 of the broadband light 44 encompasses all of the wavelength channels of the network. In other embodiments, the bandwidth 48 of the broadband light 44 encompasses a sub-set of the wavelength channels of the network. In some embodiments, two or more broadband light sources 42 may be provided for generating respective broadband lights 44, each of which encompasses a respective subset of the wavelength channels of the network.

Figure 1A:
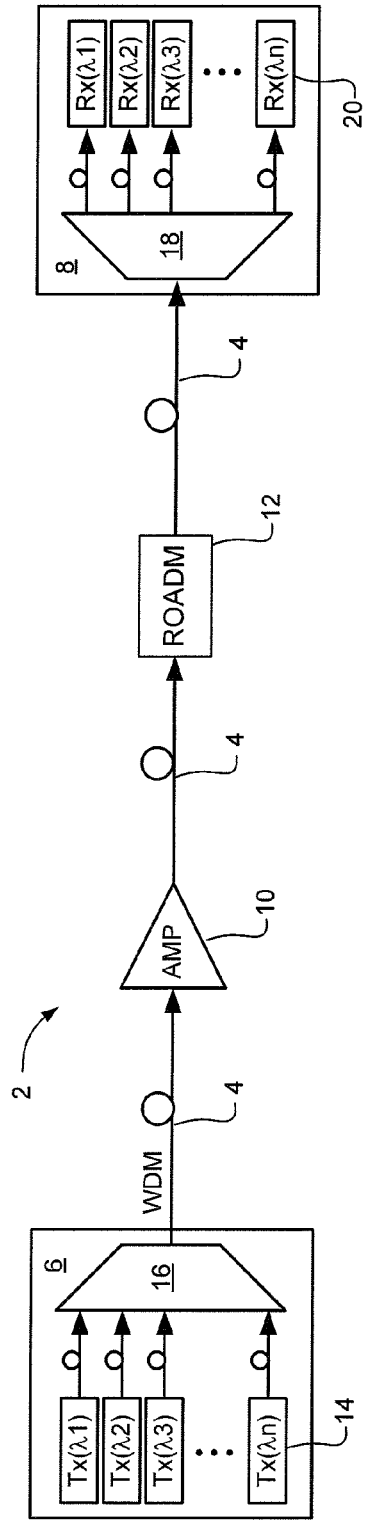
FIGs. 1a and 1b schematically illustrate elements of an optical network known in the art.
Figure 3:
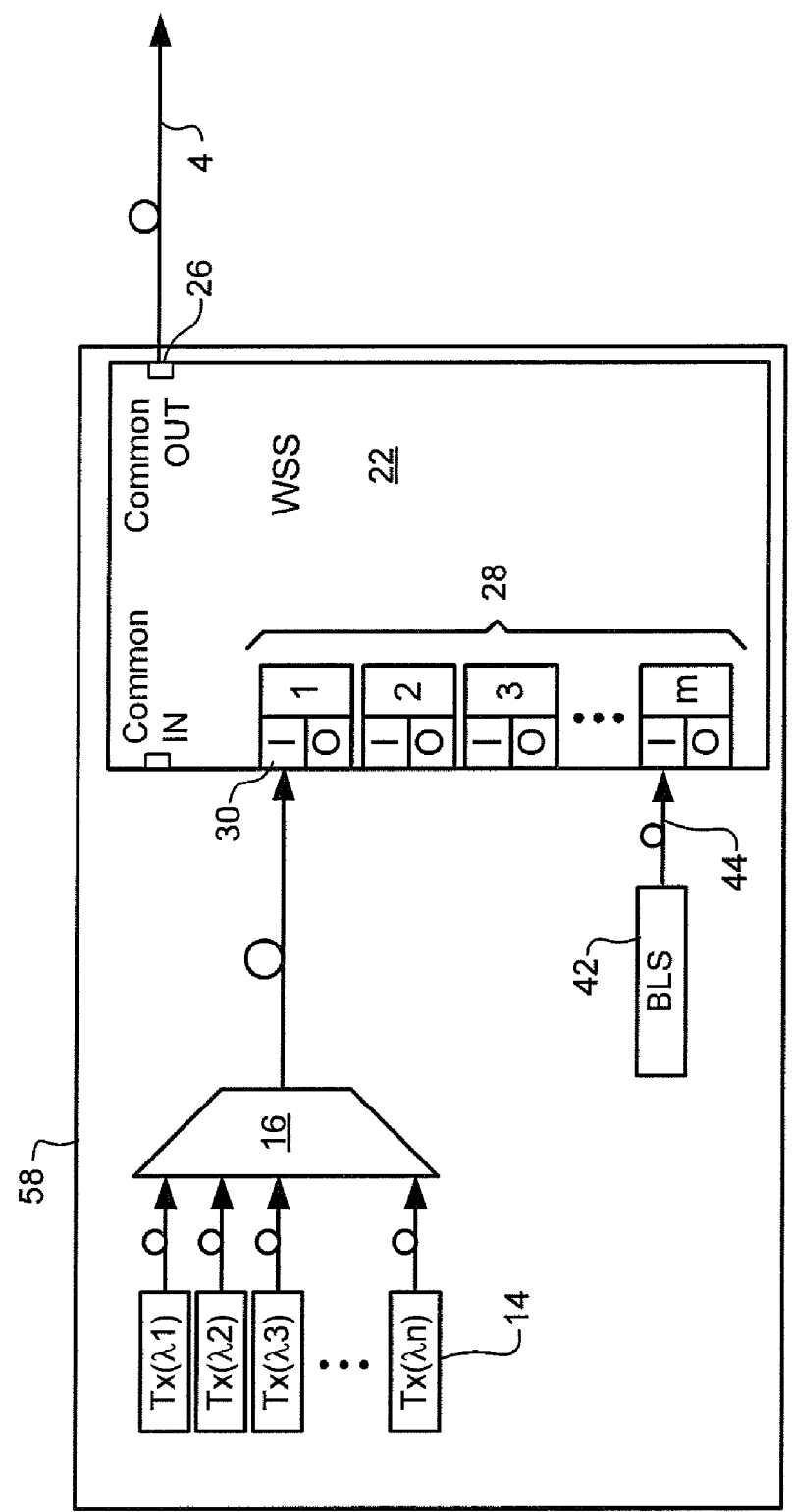
FIG. 3 schematically illustrates elements of a transmitter node implementing techniques in accordance with a representative embodiment of the present invention.

FIG. 3 illustrates a transmitter node 58 implementing techniques in accordance with the present invention. As may be seen in FIG. 3, the transmitter node 58 is similar to the conventional node 6 described above with reference to FIG. 1a, in that a set of n parallel channel transmitters 14 generate respective optical data signals within corresponding active optical channels of the network. Channel transmitters associated with inactive channels are either not installed, or else are not generating an optical signal. An optical MUX 16 combines each of the active wavelength channels into a WDM signal, which is supplied to the input 30 of a WSS 22, and switched through to the common-OUT port 26 to be launched through the optical fibre link 2.

A BLS 42 generates a broadband light 44, which is supplied to an input 30 of one of the switch ports 28, as described above in reference to FIGS. 2a and 2b. Accordingly, the WSS 22 is controlled such that narrowband lights corresponding to inactive wavelength channels are switched through to the common-OUT port 26, and so multiplexed with the active wavelength channels in the WDM signal launched into a downstream span 4 of the optical link 2. Narrowband lights corresponding to active wavelength channels can be either terminated within the WSS 22, or switched to the output 32 of a another one of the switch ports 28, and subsequently terminated.

As may be appreciated, the operation of the transmitter node 58 of FIG. 3 is such that the WDM signal launched into the optical link 2 always has a spectral loading of 100%, independently of the number of active wavelength channels. Consequently, adding a new active channel can be accomplished by replacing the narrowband light corresponding with that channel with an optical signal transmitted by an appropriate one of the channel transmitters 14. This can be readily accomplished using the conventional per-channel switching function of the WSS 22. Similarly, the conventional per-channel switching function of the WSS 22 can be used to replace an optical signal transmitted by one of the channel transmitters 14 with the narrowband light corresponding to that channel, and thereby subtract an active channel from the network. In both of these configuration changes, the spectral loading in the link 2 remains constant at 100%. Furthermore, when the power level of the narrow band light for a given channel is close (preferably equal) to that of the optical signal transmitted by the associated channel transmitter 14, changing the network configuration results in little if any change in the total optical power within the downstream span 4. As a result, active channels can be added and subtracted from the network without significantly perturbing any other active channels within the network. Thus, the dynamic analog optical network is converted into a digital representation, in which active channels can be easily and quickly added or subtracted using the well known per-wavelength switching functionality of a Wavelength Selective Switch 22.

Figure 4:
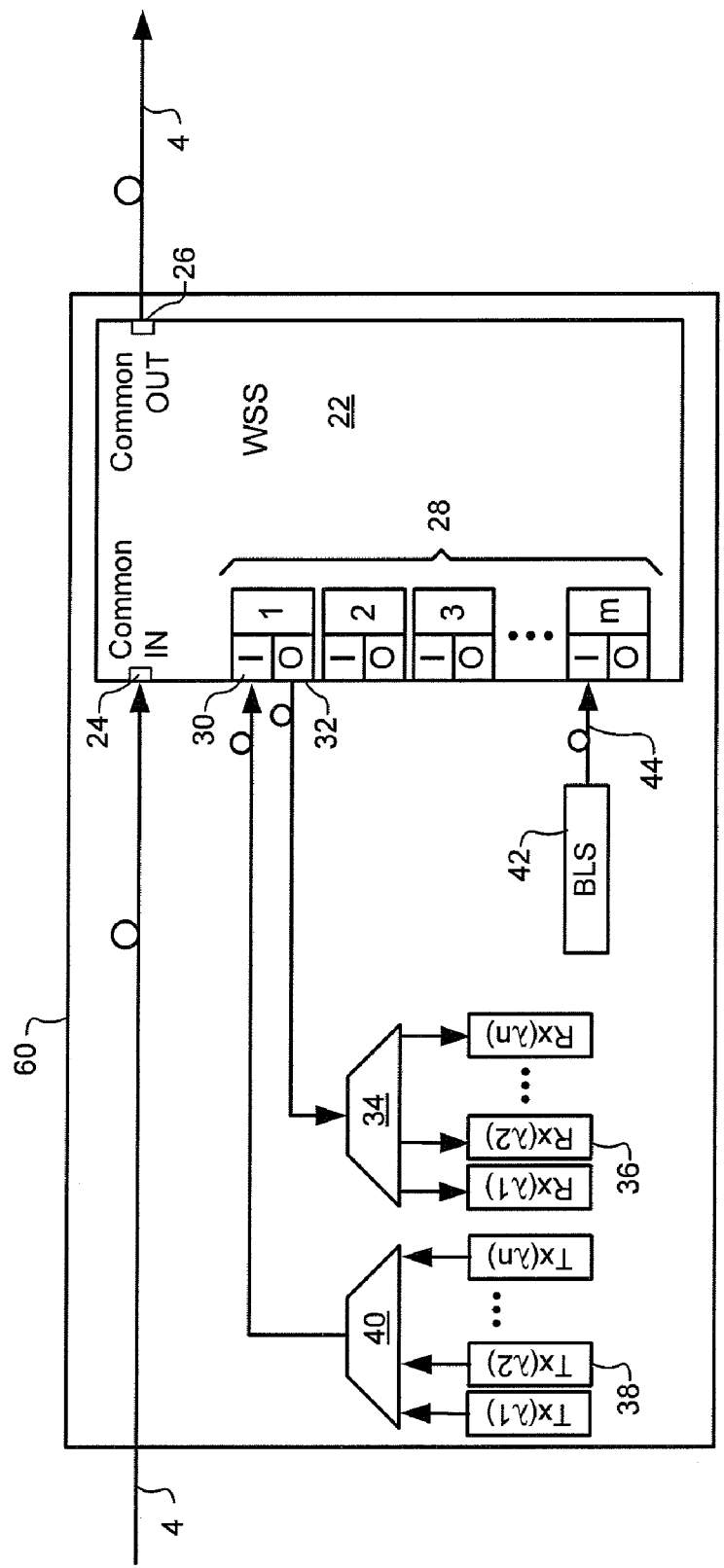
FIG. 4 schematically illustrates elements of a Reconfigurable Optical Add-Drop Multiplexer (ROADM) implementing techniques in accordance with a representative embodiment of the present invention.

FIG. 4 illustrates a ROADM 60 implementing techniques in accordance with the present invention. As may be seen in FIG. 4, the ROADM 60 is closely similar to the conventional ROADM 12 described above with reference to FIG. 1b. Thus, the WSS 22 operates in a conventional manner to selectively switch wavelength channels from the common-IN port 24 to the output 32 of any one of the switch ports 28, and to selectively switch wavelength channels received through the input 30 of any given switch port 28 to either the common-OUT port 26 or to the output 32 of any one of the other switch ports 28. As in the ROADM 12 of FIG. 1b, switch port No. 1 is used to support local Add/Drop traffic. Thus, a set of wavelength channels to be dropped is identified, and the WSS 22 controlled to switch these channels of WDM signal received through the common-IN port 24 to the output 32 of switch port No. 1, while routing the other channels to the common-OUT port 26. Conversely, channels to be added are switched from the input 30 of switch port No. 1 to the common-OUT port 26.

Figure 1B:
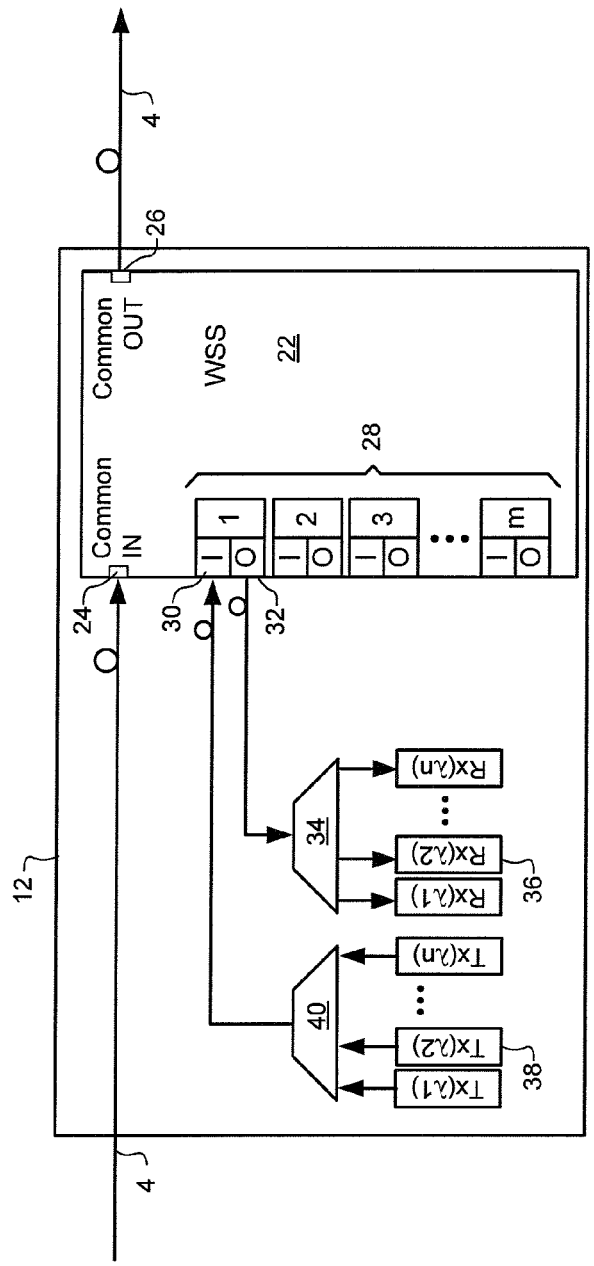

The ROADM 60 of FIG. 4 differs from the conventional ROADM 12 of FIG. 1b, in that a BLS 42 generates a broadband light 44, which is supplied to an input 30 of one of the switch ports 28, as described above in reference to FIGS. 2a and 2b. Accordingly, the WSS 22 is controlled such that narrowband lights corresponding to inactive wavelength channels are switched through to the common-OUT port 26, and so multiplexed with the active wavelength channels in the WDM signal launched into a downstream span 4 of the optical link 2. Narrowband lights corresponding to active wavelength channels can be either terminated within the WSS 22, or switched to the output 32 of another one of the switch ports 28, and subsequently terminated.

As in the transmitter node 58 of FIG. 3, the operation of the ROADM 60 is such that the WDM signal launched into a downstream span 4 of the optical link 2 always has a spectral loading of 100%, independently of the number of active wavelength channels. Consequently, adding a new active channel can be accomplished by replacing the narrowband light corresponding with that channel with an optical signal transmitted by an appropriate one of the channel transmitters 38. This can be readily accomplished using the conventional per-channel switching function of the WSS 22. Similarly, the conventional per-channel switching function of the WSS 22 can be used to replace an optical signal transmitted by one of the channel transmitters 38 with the narrowband light corresponding to that channel, and thereby subtract an active channel from the network. In both of these configuration changes, the spectral loading in the downstream span 4 remains constant at 100%. Furthermore, when the power level of the narrow band light for a given channel is close to that of the optical signal transmitted by the associated channel transmitter 38, changing the network configuration results in little if any change in the total optical power within the downstream span 4. As a result, active channels can be added and subtracted from the network without significantly perturbing any other active channels within the network. Thus, the dynamic analog optical network is converted into a digital representation, in which active channels can be easily and quickly added or subtracted using the well known per-wavelength switching functionality of a Wavelength Selective Switch 22.

In some embodiments, an optical network link 2 can be provisioned using a transmitter node 58 and ROADMs 60 at every wavelength channel generation and/or switching point. The link 2 can then be initially started, by driving the BLS 42 of the transmitter node 58 as described above, and controlling the WSS 22 to route all of the narrow band lights to the common-OUT port 26 to be launched in to the link 2. On this basis, the steady state optical network control system can be initialized, acquire signal, and achieve stable operation on the basis of the emulated WDM signal 52. Subsequently, channel transmitters 14 in the transmitter node 58 can be started, and the WSS channel switching function used to add the corresponding active channels added to the network as needed to support subscriber traffic load, all as described above. Similarly, as active channels are dropped and/or added by an ROADM 60, the narrowband lights combed from the ROADM's local BLS 42 can be used to maintain the downstream spectral loading constant at 100%.

Although the invention has been described with reference to certain specific embodiments, various modifications thereof will be apparent to those skilled in the art without departing from the spirit and scope of the invention as outlined in the claims appended hereto.

I claim:

1. A system for enabling reconfiguration of a Wavelength Division Multiplexed (WDM) optical communications network comprising active and inactive wavelength channels, the system comprising:

a broadband light source for generating a broadband continuous wave light having a bandwidth corresponding to a channel band of the network;
a wavelength selective switch comprising:
  a first switch port connected to receive one or more active wavelength channels;
  a second switch port connected to receive the broadband continuous wave light from the broadband light source, the wavelength selective switch being configured to comb the broadband continuous wave light into a plurality of narrowband lights respectively corresponding with wavelength channels of the network; and
  a common-OUT port for outputting a WDM signal for transmission through a downstream fibre span of the network;
wherein the wavelength selective switch is controlled to switch the active wavelength channels to the common-OUT port of the wavelength selective switch and to selectively switch narrowband lights corresponding to inactive wavelength channels to the common-OUT port, such that the WDM signal output from the common-OUT port has a spectral loading of 100%, independent of the number of active wavelength channels.

2. The system as claimed in claim 1, wherein a power level of the broadband continuous wave light is selected such that a power level of each narrow band light matches that of the corresponding active wavelength channel.

3. The system as claimed in claim 1, further comprising a plurality of channel transmitters for generating respective active wavelength channels of the network, and wherein the wavelength selective switch is controlled to switch the optical signals from the plurality of channel transmitters to the common-OUT port as active wavelength channels.

4. The system as claimed in claim 1, wherein the wavelength selective switch is further controlled to selectively terminate narrow band lights corresponding to active wavelength channels.

5. A node of a Wavelength Division Multiplexed (WDM) optical communications network, the node comprising:
  a plurality of channel transmitters for generating respective optical signals within corresponding active wavelength channels of the network;
  a broadband light source for generating a broadband continuous wave light having a bandwidth corresponding to a channel band of the network;
  a wavelength selective switch comprising:
    a first switch port connected to receive active wavelength channels from the channel transmitters;
    a second switch port connected to receive the broadband continuous wave light from the broadband light source, the wavelength selective switch being configured to comb the broadband continuous wave light into a plurality of narrowband lights respectively corresponding with wavelength channels of the network; and
    a common-OUT port for outputting a WDM signal for transmission through a downstream fibre span of the network;
  wherein the wavelength selective switch is controlled to switch the active wavelength channels from the first switch port to the common-OUT port, and further to selectively switch narrowband lights corresponding to inactive wavelength channels to the common-OUT port, such that the WDM signal output from the common-OUT port has a spectral loading of 100%, independent of the number of active wavelength channels.

6. The node as claimed in claim 5, wherein a power level of the broadband continuous wave light is selected such that a power level of each narrow band light matches that of the corresponding active wavelength channel.

7. The node as claimed in claim 5, wherein the node is a reconfigurable Optical Add-Drop Multiplexer and wherein the wavelength selective switch further comprises a common-IN port for receiving a WDM signal through an upstream fibre span of the network, and wherein the wavelength selective switch is controlled to selectively switch active wavelength channels from the common-IN port to the first switch port as drop channels, and to selectively switch other active wavelength channels from the common-IN port to the common-OUT port.

8. The node as claimed in claim 7, wherein the wavelength selective switch is further controlled to terminate narrow band lights corresponding to active wavelength channels.

* * * * *